United States Patent
Bishop et al.

(10) Patent No.: US 8,914,886 B2
(45) Date of Patent: Dec. 16, 2014

(54) DYNAMIC QUARANTINING FOR MALWARE DETECTION

(71) Applicant: McAfee, Inc., Santa Clara, CA (US)

(72) Inventors: Michael G. Bishop, Thame (GB); Raoul J. Tiddy, Thame (GB); Igor Muttik, Berkhamsted (GB); Alexander J. Hinchliffe, London (GB); Christopher C. Williams, Aylesbury (GB)

(73) Assignee: McAfee, Inc., Santa Clara, CA (US)

( * ) Notice: Subject to any disclaimer, the term of this patent is extended or adjusted under 35 U.S.C. 154(b) by 81 days.

(21) Appl. No.: 13/663,277

(22) Filed: Oct. 29, 2012

(65) Prior Publication Data
US 2014/0123279 A1    May 1, 2014

(51) Int. Cl.
G06F 21/00    (2013.01)

(52) U.S. Cl.
USPC .......................................................... 726/23

(58) Field of Classification Search
USPC .......................................................... 726/23
See application file for complete search history.

(56) References Cited

U.S. PATENT DOCUMENTS

| | | |
|---|---|---|
| 2007/0107059 A1 | 5/2007 | Chasin et al. |
| 2011/0083180 A1 | 4/2011 | Mashevsky et al. |
| 2012/0096555 A1 | 4/2012 | Mahaffey |
| 2012/0240228 A1 | 9/2012 | Alperovitch et al. |
| 2013/0152200 A1* | 6/2013 | Alme et al. ..................... 726/24 |

FOREIGN PATENT DOCUMENTS

| | | |
|---|---|---|
| EP | 2 418 600 A1 | 2/2012 |
| WO | 2014/070499 A1 | 5/2014 |

OTHER PUBLICATIONS

International Search Report and Written Opinion received for PCT Patent Application No. PCT/US2013/065894, mailed on Feb. 25, 2014, 10 pages.

* cited by examiner

*Primary Examiner* — Tu Nguyen
(74) *Attorney, Agent, or Firm* — Baker Botts L.L.P.

(57) ABSTRACT

A method includes detecting a portion of data on an electronic device, determining a first representation of the malware status of the data, quarantining the data for a period of time, estimating whether the data is associated with malware by comparing the first and second representation, and, based on the estimation, releasing the data from quarantine. The first representation indicates that the malware status of the data is not certain to be safe and the malware status of the data is not certain to be malicious.

20 Claims, 7 Drawing Sheets

DYNAMIC QUARANTINING FOR MALWARE DETECTION

TECHNICAL FIELD OF THE INVENTION

Embodiments of the present invention relates generally to computer security and malware protection and, more particularly, to dynamic quarantining for malware detection.

BACKGROUND

Malware infections on computers and other electronic devices are very intrusive and hard to detect and repair. Anti-malware solutions may require matching a signature of malicious code or files against evaluated software to determine that the software is harmful to a computing system. Malware may disguise itself through the use of polymorphic programs or executables wherein malware changes itself to avoid detection by anti-malware solutions. In such case, anti-malware solutions may fail to detect new or morphed malware in a zero-day attack. Malware may include, but is not limited to, spyware, rootkits, password stealers, spam, sources of phishing attacks, sources of denial-of-service-attacks, viruses, loggers, Trojans, adware, or any other digital content that produces unwanted activity.

BRIEF DESCRIPTION OF THE DRAWINGS

For a more complete understanding of embodiments of the present invention and its features and advantages, reference is now made to the following description, taken in conjunction with the accompanying drawings, in which.

DETAILED DESCRIPTION

Figure 1:
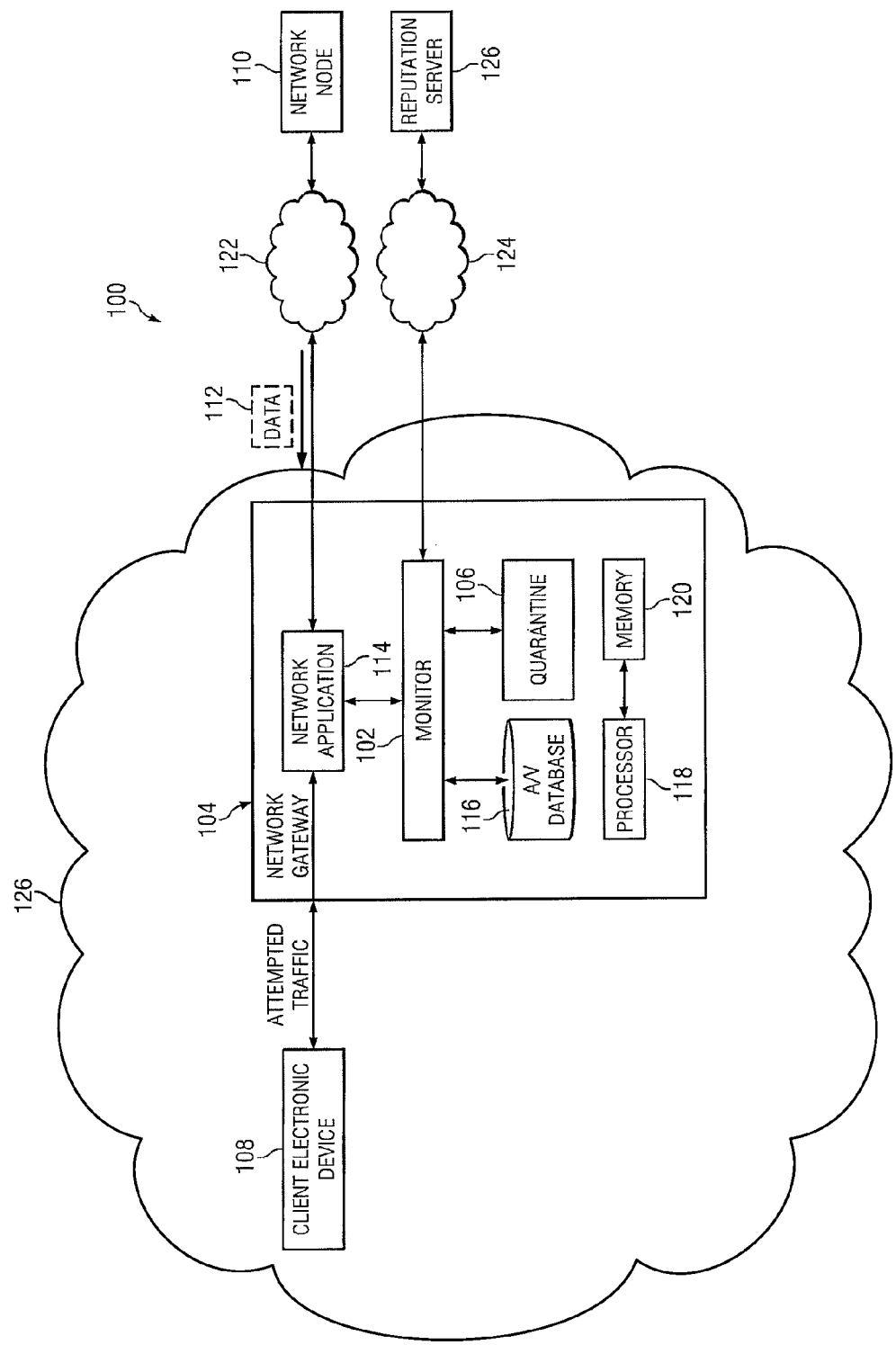
FIG. 1 is an illustration of an example system for dynamic quarantining for malware detection.

FIG. 1 is an illustration of an example system 100 for dynamic quarantining for malware detection. System 100 may be configured to execute monitor 102 to evaluate information such as data 112 for malware through dynamic quarantine. In one embodiment, data 112 may be resident on an electronic device that monitor 102 is configured to scan for malware. In another embodiment, monitor 102 may be configured to intercept or otherwise receive data 112. Monitor 102 may be configured to evaluate data 112 as to its malware status or reputation, place data 112 into quarantine 106, and, after a time delay, reevaluate data 112 as to its malware status or reputation. In one embodiment, monitor 102 may be configured to place data 112 into quarantine 106 and reevaluate data 112 if the original evaluation determined that the malware status of data 112 was unknown or could not be determined with sufficient certainty. During the reevaluation of data 112, monitor 102 may be configured to determine whether the malware status of data 112 is now known or has otherwise changed and, based on the results of the reevaluation, allow or block data 112. Further, monitor 102 may be configured to continue to repeat the reevaluation process when the malware status of data 112 continues to be unknown or not determined with sufficient certainty.

Monitor 102 may be configured to execute on any suitable portion of system 100. Monitor 102 may be configured to execute on, for example, a server, computer, node, gateway, router, transmitter, or receiver. In one embodiment, monitor 102 may be executing on a network management device such as network gateway 104.

Network gateway 104 may be configured to provide access to a network, wide-area-network, intranet, mobile network, subnetwork, or other facility such as local area network ("LAN") 126. In one embodiment, network gateway 104 may be included within LAN 126. In another embodiment, network gateway 104 may be outside of LAN 126. Network gateway 104 may include a network application 114 configured to perform network gateway services on behalf of the nodes or other devices on LAN 126. Network gateway 104 may be configured to provide access between LAN 126 and other networks, such as an intranet, network, subnetwork, or the Internet. Portions thereof may include network 122 as shown in FIG. 1. Network gateway 104 may be configured to receive traffic, such as data 112, from outside of LAN 126 intended for a destination within LAN 126, such as client electronic device 108. Traffic may originate from a network node 110, which may include a network, subnetwork, server, website, or other suitable entity and may travel through network 122 to arrive at network gateway 104. Client electronic device 108 may include, for example, a computer, laptop, server, handheld computing device, network device, or other digital entity communicatively coupled on LAN 126.

Monitor 102 may reside on network gateway 104, or on any other electronic device, server, or other suitable mechanism to scan for malware. Monitor 102 may be implemented in, for example, any application, process, script, module, executable, executable program, server, executable object, library, or other suitable digital entity. Monitor 102 may include logic or instructions for execution by a processor such as processor 118. The logic of instructions of monitor 102 may be resident within a memory 120 communicatively coupled to processor 118.

Processor 118 may comprise, for example a microprocessor, microcontroller, digital signal processor (DSP), application specific integrated circuit (ASIC), or any other digital or analog circuitry configured to interpret and/or execute program instructions and/or process data. In some embodiments, processor 118 may interpret and/or execute program instructions and/or process data stored in memory 120. Memory 120 may be configured in part or whole as application memory, system memory, or both. Memory 120 may include any system, device, or apparatus configured to hold and/or house one or more memory modules. Each memory module may include any system, device or apparatus configured to retain program instructions and/or data for a period of time (e.g., computer-readable media).

In one embodiment, monitor 102 may be communicatively coupled to network application 114 or to other portions of network gateway 104 in order to receive or scan for data 112. Monitor 102 may access data 112 in any suitable manner, such as by intercepting data 112 directly or by being accessed or called by network application 114 upon receipt of data 112. In another embodiment, monitor 102 may access data 112 such as by scanning for malware in memory or on disk of an electronic device, such as network gateway 104 or client electronic device 108.

Data 112 may include, for example, an e-mail, e-mail attachment, file, executable, executable program, script, code, application, or other entities. Portions of data 112 to be analyzed by monitor 102 may include, for example, executable contents such as code, sensitive data portions such as those known to be exploited by malware, hyperlinks or other addresses to third parties, sender address, message text, indicators of spam, or other suitable information. Monitor 102 may be configured to uniquely identify portions of data 112 by creating a digital signature or hash based on the contents. The unique identification may be used by monitor 102 to look up data 112 in information sources for malware-related information.

Network node 110 may include a server, website, or other network entity accessible by client electronic device 108 or another entity in system 100. Network node 110 may contain malicious contents in the form of data 112. The malicious contents may be for a disguised download and initiated by malicious agents on client electronic device 108. For example, malware executing on client electronic device 108 may contact network node 110 to download additional content—in the form of data 112—to exploit the system resources of client electronic device 108. Network node 110 may spoof legitimate data, e-mail, pages, or other content for client electronic device 108. Client electronic device 108 may attempt to download malicious applications, e-mail, e-mail attachments, data, files, code, or other content—in the form of data 112. For example, a web browser application on client electronic device 108 may access network node 110 for a seemingly legitimate website, but scripts downloaded as part of data 112 for execution in client electronic device 108 may include malware. In another example, network node 110 may send a legitimate-appearing e-mail but with a malicious e-mail attachment or transfer a legitimate looking file. Such attachments or files may include, for example, executables, executable programs, scripts, or seemingly innocuous data files for known applications, such as word processing files, PDF files, or JavaScript. Thus, malware may infect client electronic device 108, for example, executing as a malicious application or by exploiting weaknesses in a known application. Malware may exploit weaknesses in a known application by causing the application to open, run, or execute a file or code embedded with instructions to exploit the weaknesses of the known application. Such malware attacks may include those exploiting stack, heap, or other buffer overruns or overflows.

Monitor 102 may be communicatively coupled to antivirus database 116, which may include signatures, libraries, heuristic rules, whitelists—containing information about data, software, or websites known to be safe, blacklists—containing information about data, software, or websites known to be associated with malware, or any other information regarding identification of malware. Monitor 102 may be configured to compare received information, such as data 112, against antivirus database 116 to determine whether the received information is malicious or otherwise associated with malware. Antivirus database 116 may be stored locally to monitor 102, such as within network gateway 114. Monitor 102 or another suitable entity may be configured to periodically update the contents of antivirus database 116 from an anti-malware server. Antivirus database 116 may be implemented in any suitable manner, such as with a file, record, data structure, library, application, script, or database.

However, given the localized implementation of antivirus database 116, the contents and information contained therein may not be completely up-to-date. In addition, antivirus database 116 may have no information regarding "zero-day" attacks of malware, wherein a particular instance of malware is encountered for a first time. Further, antivirus database 116 may not have access to various information sources, such as field reports from various anti-malware clients or anti-malware laboratory results. Accordingly, monitor 102 may be configured to access an anti-malware server through a computing cloud to determine the latest anti-malware information. Such an anti-malware server may include, for example, reputation server 126.

Monitor 102 may be configured to access reputation server 126 to determine the malware status of received information, such as data 112. Reputation server 126 may be executing and operating as a cloud computer service or software-as-a-service on network 124. Network 124 may include, for example, the Internet, an intranet, wide-area-networks, back-haul-networks, peer-to-peer-networks, or any combination thereof. If monitor 102 attempts to access reputation server 126 and reputation server 126 is unavailable for any reason, then monitor 102 may be configured to repeat the attempt again. Such a repeated attempts may be made upon a first determination by monitor 102 for a given piece of data to reputation server 126 or in any subsequent determination by monitor 102 for the given piece of data.

For a given piece of information, such as data 112, reputation server 126 may be configured to determine whether data 112 is associated with malware. In one embodiment, reputation server 126 may be configured to provide analysis for data 112 in which it is not definitively known whether or not data 112 is associated with malware. If it is definitively known whether, for example, a hash of the contents of data 112 is matched to malware, or whether the sending address of data 112 is a known malware network server, then rules may be sent to various anti-malware clients, such as monitor 102. The clients, such as monitor 102, would then determine that the received data 112 is malicious and take appropriate corrective action. However, in some cases, it may not be definitively known whether or not data 112 is associated with malware. For example, a hash, signature, or network address not previously encountered may be contained within data 112. In another example, analysis of the hash, signature, or network address of data 112 may not have yielded a determination definitively concluding that data 112 is safe or unsafe. Thus, reputation server 126 may be configured to track reports, instances, and associated information for various software and network addresses to determine a likelihood that the software or network address is malicious. The likelihood may be based on any suitable criteria, such as distribution of reported instances, source of attempted transmissions, statuses of certificates, or other indications of suspicious activity. Taken individually, these indications of suspicious activity might not definitely prove the malware status of data 112. However, reputation server 126 may use them as factors in providing an estimation of the likelihood that data 112 is malicious. Furthermore, the indication of suspicious activity may be changing in real time, as, for example, software is reported from various clients, or a network server is compromised, causing it to participate in a malware attack. Reputation server 126 may be configured to provide a quantification of the likelihood that data 112 is malicious to monitor 102.

Figure 2:
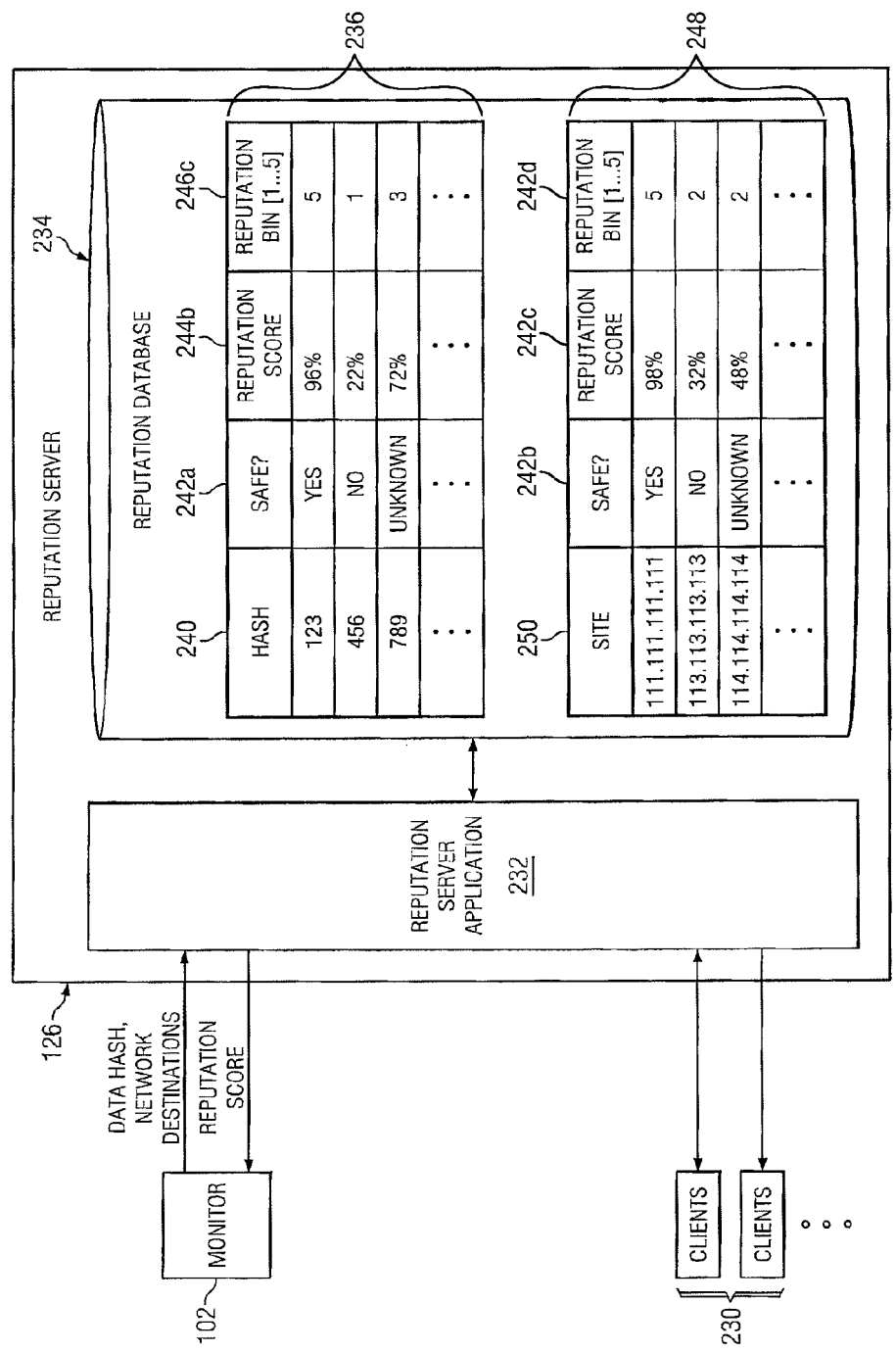
FIG. 2 is an illustration of the configuration and operation of an example reputation server.

FIG. 2 is an illustration of the configuration and operation of an example reputation server 126. Reputation server 126 may include a reputation server application 232 configured to handle requests for malware analysis, accept reports from various clients 230, and access and maintain reputation information in reputation database 234. Reputation server application 232 may be implemented in any suitable application, executable, script, program, library, function, module, or other suitable entity. Reputation server application 232 may be communicatively coupled to monitor 102, reputation database 234, and clients 230.

As information about potentially malicious software or network addresses is observed by various anti-malware clients 230, reputation server application 232 may receive such information and store it in reputation database 234. Based on rules, heuristics, and the observations reported by such clients 230, reputation database 234 may generate a likelihood that the software or network address is malicious. Clients 230 may be implemented by anti-malware software operating on electronic devices located across a network such as the Internet, a wide-area-network, backhaul networks, peer-to-peer networks, or other suitable entities. In one embodiment, clients 230 may be implemented using an instance of monitor 102.

Reputation database 234 may be implemented in any suitable manner, such as with a database, file, record, server, library, script, or any suitable combination thereof. Reputation database 234 may include software information 236, wherein a likelihood that a given piece of digital information is malicious may be stored. Software information 236 may also include data forming a basis for the likelihood. Software information 236 may be indexed in any suitable manner, such as file name, signature, or hash 240. Reputation database 234 may include network address information 248, wherein a likelihood that a given network entity is malicious may be stored. Network address information 248 may also include data forming a basis for the likelihood. Network address information 248 may be indexed in any suitable manner, such as website address, domain or server name, internet protocol ("IP") address, or other indication of site 250.

The likelihoods of malware in software information 236 or network address information 248 may be expressed in a reputation score. The reputation score may include, for example, a percentage score or in a reputation ranking. Any suitable mechanism or manner of expressing a reputation score, percentage, evaluation, or ranking may be used. In the example of FIG. 2, reputation score may be expressed as a percentage-certain reputation score 244 that the data is safe, or as a reputation ranking 246 reputation score within the range of one to five, one being the most certain malicious and five being the most certain safe. While reputation database 234 may address data in which it is not certain whether or not the data is malicious, reputation database 234, reputation server application 232, or a recipient of reputation scores such as monitor 102 may apply thresholds for an estimation of whether the data in question will be treated as malware or treated as safe. For example, data with a percentage-certain reputation score 244 of greater than ninety percent may be treated as safe, while data with a percentage-certain reputation score 244 of less than forty percent may be treated as malicious. Data with a percentage-certain reputation score 244 in between these thresholds may be considered to be unknown as to malware status. Further, data for which no entries exist in reputation database 234, or for which not enough information exists to generate a reputation score may be treated as unknown. An estimated safe, estimated malicious, or unknown status may be stored in status indicators 242. The precise analysis of reputation and associated thresholds may be adjusted depend upon the experience and skill of one implementing reputation server 126.

Reputation server application 232 may be configured to accept a request for data 112 from monitor 102. Reputation server application 232 may be configured to access the corresponding reputation score and status in reputation database 234 by using the index of data 112 in network address information 248 or software information 236. Reputation server application 232 may return, for example, a corresponding reputation score in the form of percentage-certain reputation score 244 or reputation ranking 246 to monitor 102.

Returning to FIG. 1, given a reputation score for data 112 from reputation server 126, monitor 102 may be configured to take appropriate action. For example, if the reputation score from reputation server 126 is above a given threshold, such as ninety percent, monitor 102 may be configured to allow data 112 to be transmitted to client electronic device 108. In another example, monitor 102 may be configured to allow data 112 to be executed, loaded into memory, or remain resident on an electronic device. If the reputation score from reputation server 126 is below a given threshold, such as forty percent, monitor 102 may be configured to block data 112 to be transmitted to client electronic device 108 or from being executed or loaded into memory. In situations where analysis or reputation indicate that data 112 poses a particular kind of intermediate risk, such as a spam e-mail, monitor 102 may be configured to allow an administrator or user of system 100 to manually allow data 112 to be accessed, retrieved, or sent. However, the reputation score from reputation server 126 may not definitively indicate whether or not data 112 is malicious. Further, the reputation score from reputation server 126 may not reach suitable thresholds, either high or low, defining how the data 112 should be de facto treated. Allowing data 112 with such unknown malware status to proceed to client electronic device 108 may allow malware to reach client electronic device 108. Allowing data 112 with such unknown malware status to be executed or loaded into memory may allow malware to operate. Furthermore, denying data 112 with such unknown malware status to proceed to client electronic device 108 may be a false-positive, wherein legitimate transmissions are falsely denied.

Monitor 102 may be configured to determine, based on, for example, accessing antivirus database or reputation server 126, that the malware status for data 112 is unknown. Monitor 102 may be configured to place data 112 with unknown malware status into quarantine 106. Quarantine 106 may store data 112 in a secure manner such that data 112 is unable to execute or otherwise affect the operation of network gateway 104 or client electronic device 108. Quarantine 106 may be implemented in any suitable manner, such as a secured portion of memory, database, sandbox, e-mail quarantine, or e-mail store. Quarantine 106 may be implemented on any suitable device, such as client electronic device 108 or network gateway 104.

Because reputation analysis may change and evolve over time as additional behaviors and distributions are observed in conjunction with the data in question, monitor 102 may be configured to hold data 112 with unknown malware status in quarantine and subsequently perform an additional evaluation of data 112 later in time. Based on the additional evaluation of data 112, monitor 102 may be configured to automatically allow data 112 to be accessed or to proceed to client electronic device 108, notify an operator that data 112 is safe and may be allowed to be accessed to proceed, block data 112, or continue to quarantine data 112 until performing an additional, subsequent evaluation of data 112. Thus, system 100 may utilize dynamic quarantine, wherein system 100 is configured to place data 112 into quarantine 106 and to subsequently release data 112 from quarantine 106 based on additional evaluations of data 112.

Monitor 102 may be configured to utilize dynamic quarantine by conducting the additional evaluation of data 112. The additional evaluation may be conducted by comparing data 112 against antivirus database 116, wherein antivirus database 116 has received updated rules, heuristics, or other malware criteria. Further, monitor 102 may be configured to conduct the additional evaluation of data 112 by accessing reputation server 126, wherein information in reputation server 126 may have been updated since the previous evaluation. The updated evaluation of data 112 may thus be conducted by utilizing, for example, additional information from clients 230 regarding other instances of data 112.

Monitor 102 may be configured to repeat reevaluation of data 112. In one embodiment, monitor 102 may be configured to repeat evaluation of data 112 for a total length of time, such as twenty-four-hours. If the malware status of data 112 has not been resolved, according to the original criteria or according to the additional criteria described herein, monitor 102 may be configured to handle data 112 as if it were malicious. Further, monitor 102 may be configured to take corrective action, such as blocking data 112, deleting data 112 from quarantine 106, sending an error message to the sender network node 110, sending a spoofed message to the sender network node 110, or alerting a system administrator. Furthermore, monitor 102 may be configured to report data 112 to reputation server 126, along with information such as its identifying information, intended recipient, and network node 110. In another embodiment, monitor 102 may be configured to repeat evaluation of data 112 with a given frequency, such as once every ten minutes. If the malware status of data 112 has not been resolved, according to the original criteria or according to the additional criteria described herein, monitor 102 may be configured to subsequently repeat the evaluation of data 112. The evaluation may be repeated according to a total length of time as described above.

Monitor 102 may be configured to use any suitable criteria for dynamic quarantine during reevaluation of data 112. In one embodiment, monitor 102 may be configured to use the same criteria during reevaluation of data 112 as was used in the original evaluation. For example, if a reputation score of ninety percent was a minimum threshold by which data 112 would be considered safe during the original evaluation of data 112, the same threshold may be used in the reevaluation of data 112. In another example, if a reputation score of forty percent was a maximum threshold by which data 112 would be considered malicious during the original evaluation of data 112, the same threshold may be used in the reevaluation of data 112. Thus, any reputation score between such thresholds may continue to cause data 112 to be considered unknown as to malware status. However, insufficient information may be available for data 112 to eventually be treated as safe or malicious. Consequently, in another embodiment, monitor 102 may be configured to use different criteria during reevaluation of data 112 as was used in the original evaluation. In further embodiments, monitor 102 may be configured to apply additional, different criteria during subsequent iterations of evaluation from previous reevaluations.

Monitor 102 may be configured to determine for dynamic quarantine whether the reputation score for data 112 has changed from previous evaluations. In one embodiment, monitor 102 may be configured to determine that, if the reputation score has lowered, data 112 is to be handled as if it is malicious. In an additional embodiment, monitor 102 may be configured to determine that, if the reputation score has increased, data 112 is to be handled as if it is safe.

Furthermore, monitor 102 may be configured to determine for dynamic quarantine whether the reputation score for data 112 has substantially changed from previous evaluations. The change may be measured by, for example, absolute difference in reputation score or percentage difference in reputation score. In one embodiment, monitor 102 may be configured to determine that, if the reputation score has lowered a certain amount or percentage, data 112 is to be handled as if it is malicious. In an additional embodiment, monitor 102 may be configured to determine that, if the reputation score has increased a certain amount or percentage, data 112 is to be handled as if it is safe. In further embodiments, the criteria for change—whether in absolute or percentage terms—may change during subsequent iterations of evaluation. For example, the criteria amount may be lowered during later evaluations as compared to the criteria amount used during the first reevaluation, such that eventually smaller changes will trigger a particular handling of data 112.

In addition, monitor 102 may be configured to determine for dynamic quarantine whether the reputation score for data 112 has reached an intermediate threshold from previous evaluations. Intermediate thresholds may include a lower threshold, under which data 112 is treated as malicious, and an upper threshold, over which data 112 is treated as safe. The lower threshold may be higher than a previously used lower threshold, and the upper threshold may be lower than a previously used upper threshold. For example, the intermediate threshold treating data 112 as if it is malicious may be a higher reputation score—such as fifty percent—than what was originally used—such as forty percent. Thus, during reevaluation if a reputation score for data 112 has moved to forty-nine percent, monitor 102 may determine that the reputation score is below the intermediate malicious threshold and treat data 112 as if it is malicious. In one embodiment, monitor 102 may be configured to determine that, if the reputation score has lowered to below a lower intermediate threshold, data 112 is to be handled as if it is malicious. In an additional embodiment, monitor 102 may be configured to determine that, if the reputation score has increased to above an upper intermediate threshold, data 112 is to be handled as if it is safe. In further embodiments, the intermediate thresholds may change during subsequent iterations of evaluation. For example, the lower threshold may be raised or the upper threshold may be lowered during later evaluations, such that eventually smaller changes will trigger a particular handling of data 112. In other embodiments wherein thresholds were not originally applied by monitor 102 to data 112 with unknown malware status, monitor 102 may be configured to apply thresholds during reevaluation.

Monitor 102 may be configured to evaluate any suitable data 112 received from network node 110. Furthermore, monitor 102 may be configured to apply dynamic quarantine through reevaluation, in the manners described herein, any suitable data 112 for which an initial determination indicates that the malware status of data 112 is unknown. In one embodiment, monitor 102 may be configured to evaluate and reevaluate the malware status of all data received at network gateway 104. In another embodiment, monitor 102 may be configured to evaluate and reevaluate the malware status of all data received at network gateway 104 corresponding to a particular type of traffic. For example, monitor 102 may be configured to analyze all e-mail traffic. In another example, monitor 102 may be configured to analyze all attachments to e-mail. In still yet another embodiment, monitor 102 may be configured to analyze traffic prone to malware exploitation, such as executables, JavaScript, or files for an application with a known weakness or vulnerability. In yet another embodiment, monitor 102 may be configured to evaluate and reevaluate the malware status of all data received at network gateway 104 which originates from a network node 110 whose malware status is unknown or malicious. In such an embodiment, monitor 102 may first determine the malware status or reputation of network node 110 before determining the malware status or reputation of, for example, the code or contents of data 112. In further embodiments, monitor 102 may be configured to selectively employ any of these previous embodiments for the purposes of reevaluation, wherein a first evaluation of data 112 is conducted upon all traffic or a subset of traffic, but reevaluation of data 112 with an unknown malware status is conducted upon subsets of traffic such as particular types of traffic or wherein network node 110 is malicious or unknown.

In one embodiment, monitor 102 may be configured to automatically release data 112 from dynamic quarantine so that data 112 reaches client electronic device 108 when it has determined that data 112 will be handled as if it is safe. In another embodiment, monitor 102 may be configured to notify an operator of monitor 102 that data 112 may be safely released from dynamic quarantine so that data 112 reaches client electronic device 108 when it has determined that data 112 will be handled as if it is safe. In response to operator input, monitor 102 may be configured to then release data 112 from dynamic quarantine so that data 112 reaches client electronic device 108 when it has determined that data 112 will be handled as if it is safe, or to continue to quarantine data 112.

Monitor 102 may be configured to take appropriate corrective action for data 112 in dynamic quarantine when it has determined that data 112 will be handled as if it is malicious. For example, data 112 may be deleted from quarantine 106, an error message may be sent to network node 110, a spoofed message may be sent to the sender network node 110, or a system administrator may be alerted. While data 112 was quarantined, a message may have been sent to network node 110, client electronic device 108, or an administrator indicating that data 112 was delayed. After a final decision to block data 112 or otherwise treat data 112 as if it malicious, a spoofed message may be sent to network node 110 indicating that data 112 was successful. The message may indicate that an error was encountered, wherein network node 110 may resend data 112. In some cases, spoofed or error messages may be sent upon initial quarantine of data 112. In one embodiment, malicious content within data 112 may be removed or replaced, and the remainder of data 112 sent to client electronic device 108. For example, a malicious attachment within an e-mail in data 112 may be removed, but the message content preserved. In another example, a link to a malicious website in an e-mail in data 112 may be removed, but the rest of the message content preserved.

In operation, monitor 102 may be executing on a device such as network gateway 104 to scan network traffic such as data 112 to or from a client electronic network device 108. The traffic may be made with network node 110 over network 172. Monitor 102 may intercept traffic directly or in conjunction with network application 114. Monitor 102 may selectively intercept all network traffic or a portion thereof. The selection of intercepted network traffic may be based on, for example, the source or node of the traffic, the protocols used by the traffic, the type of the traffic, or the contents of the traffic. In one embodiment, monitor 102 may evaluate the traffic by accessing one or more of antivirus database 116 and reputation server 126. If the malware status of data 112 is initially determined to be unknown, monitor 102 may place data 112 into dynamic quarantine in quarantine 106. Monitor 102 may subsequently evaluate the malware status of data 112 again. If, after subsequent evaluation, data 112 is to be treated as malicious, corrective action may be automatically taken. If, after subsequent evaluation, data 112 is to be treated as safe, data 112 may be automatically released for delivery to its intended destination such as client electronic device 108, or an operator may be notified that data 112 is safe and can be safely released for delivery. Thus, quarantine 106 may temporarily house data 112 until further determinations are made regarding its malware status.

Figure 3:
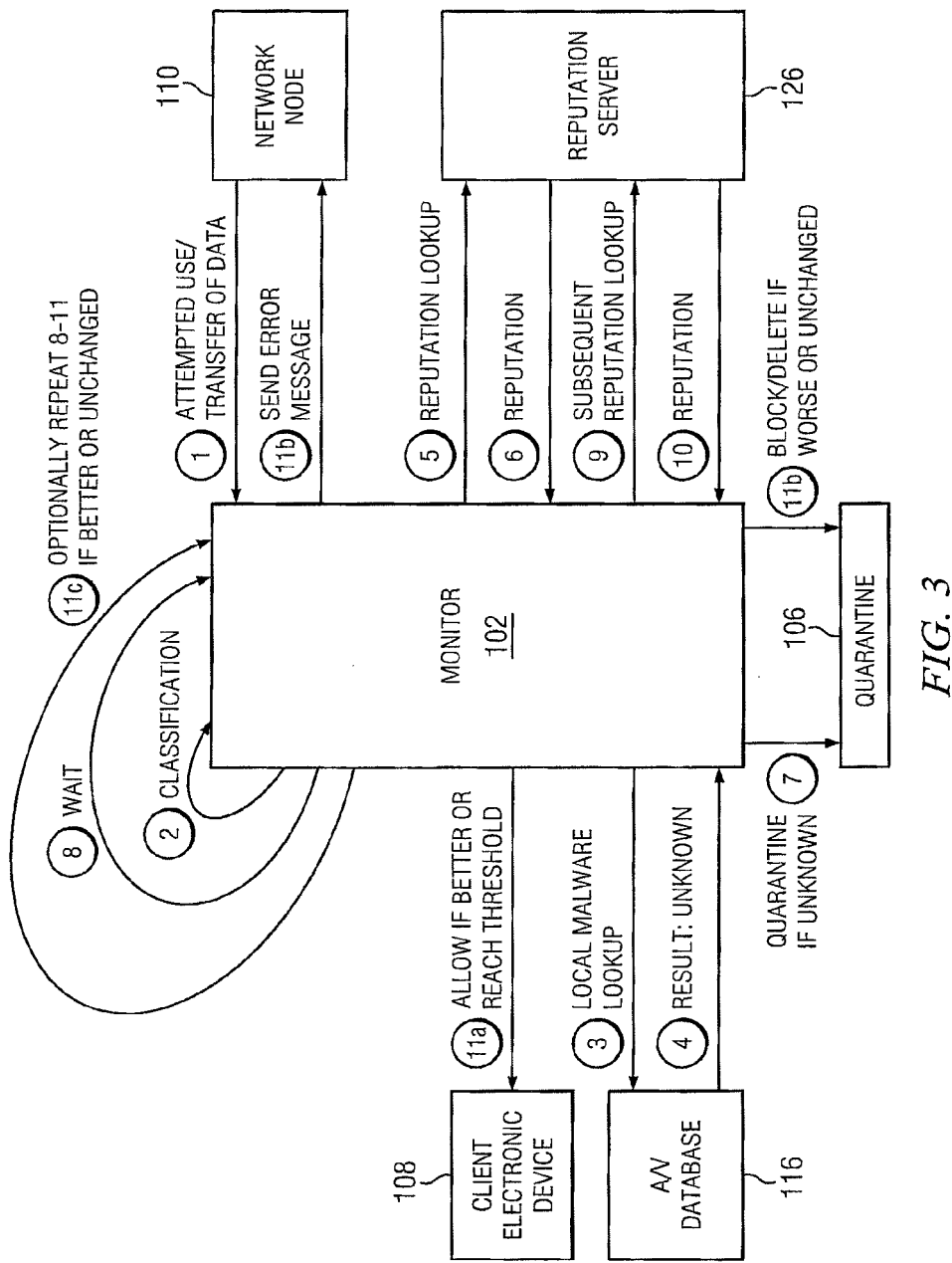
FIG. 3 is an illustration of example operation of a system for dynamic quarantining for malware detection.

FIG. 3 is an illustration of example operation of system 100 for dynamic quarantining for malware detection. At (1), in embodiment an attempted transfer of information may be received. The transfer may have originated from network node 110. The transfer may include data 112. The transfer may be intercepted by monitor 102, working alone or in conjunction with other software. In another embodiment, at (1) data 112 may be resident on an electronic device for which monitor 102 is configured to scan for malware. At (2), the data 112 may be classified. The data 112 may be classified to determine, for example, whether monitor 102 will initially evaluate its malware status or, if the initial determination is that the status is known, place data 112 into dynamic quarantine for reevaluation. For example, monitor 102 may selective analyze particular kinds of traffic such as e-mails, e-mail attachments, executable code, files associated with compromised applications, traffic with an unknown or malicious application on the client, or traffic from an unknown or malicious sender. Initial determinations regarding the application or sender may be made. Network addresses associated with data 112, such as network node 110, interim servers or devices, or links contained within data 112 may be determined. A hash or digital signature of data 112 may be determined to uniquely identify its contents.

In one embodiment, at (3) monitor 102 may access a local malware information source such as antivirus database 116 to determine whether data 112 is indicative of malware. At (4) the result may be returned. If data 112 is malicious, then it may be blocked. If data 112 is known to be safe, it may be allowed to proceed to client electronic device 108, executed, loaded into memory, or otherwise accessed by a portion of system 100 such as network gateway 104 or client electronic device 108. However, if the malware status of data 112 is unknown according to antivirus database 116, then in another embodiment at (5) monitor 102 may determine the malware status of data 112 by accessing an anti-malware server such as reputation server 126.

Reputation server 126 may determine the reputation of data 112 as identified by monitor 102 using, for example, by a network address, hash, or digital signature associated with data 112 and provided by monitor 102. As shown in FIG. 2, for example, reputation server 126 may determine that data 112 identified by the example hash value "123" has a percentage-certain reputation score 244 of ninety-six percent, or a reputation ranking 246 reputation score of five. Such reputation scores may indicate that the data 112 identified by the hash value "123" is safe. In one embodiment, reputation server 126 may contain a status indicator 242 indicating as such. Status indicator 242 may be based upon an upper threshold, above which a reputation score indicates that data 112 should be treated as if it were known to be safe. In another embodiment, monitor 102 or another user of the reputation score may apply its own thresholds to make such a status determination. Monitor 102 may allow such data 112 to be delivered to its intended recipient such as client electronic device 108, or to be loaded, executed, or otherwise accessed by, for example, network gateway 104 or client electronic device 108.

Monitor 102 may provide an indication of data 112 using the example hash value "345" to reputation server 126. Reputation server 126 may determine that data 112 identified by the example hash value "345" has a percentage-certain reputation score 244 of twenty-two percent, or a reputation ranking 246 reputation score of one. Such reputation scores may indicate that the data 112 identified by the hash value "345" is malicious. In one embodiment, reputation server 126 may contain a status indicator 242 indicating as such. Status indicator 242 may be based upon a lower threshold, below which a reputation score indicates that data 112 should be treated as if it were known to be malicious. In another embodiment, monitor 102 or another user of the reputation score may apply its own thresholds to make such a status determination. Monitor 102 may block such data 112 from being executed, loaded, or delivered to its intended recipient such as client electronic device 108, or take other corrective action.

Monitor 102 may provide an indication of data 112 using the example hash value "789" to reputation server 126. Reputation server 126 may determine that data 112 identified by the example hash value "789" has a percentage-certain reputation score 244 of sixty-four percent, or a reputation ranking 246 reputation score of three. Such reputation scores may indicate that the data 112 identified by the hash value "345" has an unknown malware status. In one embodiment, reputation server 126 may contain a status indicator 242 indicating as such. Status indicator 242 may be based upon two thresholds, between which a reputation score indicates that data 112 has an unknown malware status. In another embodiment, monitor 102 or another user of the reputation score may apply its own thresholds to make such a status determination. Monitor 102 may place such data 112 into dynamic quarantine.

Monitor 102 may provide an indication of data 112 using the example network address "111.111.111.111" to reputation server 126. Reputation server 126 may determine that the network address "111.111.111.111" associated with data 112 has a percentage-certain reputation score 244 of ninety-eight percent, or a reputation ranking 246 reputation score of five. Such reputation scores may indicate that the data 112 associated with the network address "111.111.111.111" is safe. In one embodiment, reputation server 126 may contain a status indicator 242 indicating as such. Status indicator 242 may be based upon an upper threshold, above which a reputation score indicates that data 112 should be treated as if it were known to be safe. In another embodiment, monitor 102 or another user of the reputation score may apply its own thresholds to make such a status determination. Monitor 102 may allow such data 112 to be delivered to its intended recipient such as client electronic device 108 or to be executed, loaded, or otherwise accessed by a portion of system 100 such as network gateway 104 or client electronic device 108.

Monitor 102 may provide an indication of data 112 using the example network address "113.113.113.113" to reputation server 126. Reputation server 126 may determine that the network address "113.113.113.113" associated with data 112 has a percentage-certain reputation score 244 of thirty-two percent, or a reputation ranking 246 reputation score of two. Such reputation scores may indicate that the data 112 associated with the network address "113.113.113.113" is malicious. In one embodiment, reputation server 126 may contain a status indicator 242 indicating as such. Status indicator 242 may be based upon a lower threshold, below which a reputation score indicates that data 112 should be treated as if it were known to be malicious. In another embodiment, monitor 102 or another user of the reputation score may apply its own thresholds to make such a status determination. Monitor 102 may block such data 112 from being executed, loaded, or delivered to its intended recipient such as client electronic device 108, or take other corrective action.

Monitor 102 may provide an indication of data 112 using the example network address "114.114.114.114" to reputation server 126. Reputation server 126 may determine that the network address "114.114.114.114" associated with data 112 has a percentage-certain reputation score 244 of sixty-two percent, or a reputation ranking 246 reputation score of three. Such reputation scores may indicate that the data 112 associated with the example network address "114.114.114.114" has an unknown malware status. In one embodiment, reputation server 126 may contain a status indicator 242 indicating as such. Status indicator 242 may be based upon two thresholds, between which a reputation score indicates that data 112 has an unknown malware status. In another embodiment, monitor 102 or another user of the reputation score may apply its own thresholds to make such a status determination. Monitor 102 may place such data 112 into dynamic quarantine.

An entry in reputation server 126 for data 112 may be updated with information gathered from monitor 102. Furthermore, if monitor 102 provides an indication of data 112 not found within reputation server 126, such as a hash value of "999" or associated with a network address of "116.116.116.116", reputation server 126 may indicate to monitor 102 that the status is unknown. An entry may be entered into reputation server 126 for the reported data 112 if one did not already exist.

Returning to FIG. 3, at (7) monitor 102 may place data 112 into dynamic quarantine 106 if the malware status of data 112 is unknown, such as data 112 having a hash value of "789" or "999" or associated with a network node 110 with an address of "114.114.114.114" or "116.116.116.116". For data 112 determined with high reputation scores exceeding an upper threshold or otherwise designated as safe, such as data 112 having a hash value of "123" or associated with a network node 110 with an address of "111.111.111.111", monitor 102 may allow such data 112 to be delivered to its intended recipient such as client electronic device 108 or to be executed, loaded, or otherwise accessed. For data 112 determined with low reputation scores below a lower threshold or otherwise designated as malicious, such as data 112 having a hash value of "456" or associated with a network node 110 with an address of "113.113.113.113", monitor 102 may treat such data 112 as malicious, block execution, loading, or delivery to its intended recipient such as client electronic device 108, or take other corrective action.

After placing data 112 into dynamic quarantine, at (8) monitor 102 may wait a designated length of time before reevaluating data 112. The length of time may be determined by a frequency setting for which monitor 102 will operate, such as a minute or ten minutes. In one embodiment, after placing data 112 into dynamic quarantine 106 monitor 102 may send a message to the sender, intended recipient, or a system administrator that transmission has been delayed. However, sending such a message to the sender may provide information to a malicious operator of network node 110 that the attempt to send information has been detected. Thus such a message may be withheld. An administrator or user of system 100 may manually release or delete data 112 from quarantine 106 during the period. Further, if a total threshold length of quarantine time has been exceeded for data 112 through, for example, repeated evaluation of data 112, then monitor 102 may permanently quarantine data 112 or otherwise treat data 112 as malicious. The threshold length of quarantine time may be variable, wherein the time resets if evaluations of data 112 reflects a change exceeding a threshold. Thus, late-appearing changes in the evaluation of data 112 may cause the continued reevaluation of data 112.

At (9), monitor 102 may repeat one or more evaluations of data 112 by, for example, accessing antivirus database 116 or reputation server 126, which may return the reputation or other analysis of data 112 to monitor 102 at (10). The reputation score of data 112 may have changed. Monitor 102 may use such change, or lack thereof, to make further analysis of data 112. Reputation server 126 may have a newly determine malware status for data 112, such as a safe or malicious, or a newly calculated reputation score for data 112 whose malware status continues to be unknown. Monitor 102 may apply such a new malware status for data 112 to allow data 112 or to block data 112 and take corrective action. Further, wherein data 112 continues to have an unknown malware status, monitor 102 may apply analysis based on any reputation score changes.

For example, as shown in FIG. 3, the percentage-certain reputation score 244 of data 112 identified by the hash value "789" may have changed with time from sixty-four percent to seventy-two percent. In one embodiment, such a change in reputation may change the malware status of data 112 from unknown to safe, according to thresholds maintained by monitor 102 or reputation server 126. In another embodiment, such a change may continue to keep the malware status of data 112 as unknown.

In another example, the percentage-certain reputation score 244 of data 112 associated with the network address "114.114.114.114" may have changed from sixty-two percent to forty-eight percent, or the reputation ranking 246 reputation score may have changed from three to two. In one embodiment, such a change in reputation may change the malware status of data 112 from unknown to malicious, according to thresholds maintained by monitor 102 or reputation server 126. In another embodiment, such a change may continue to keep the malware status of data 112 as unknown.

Monitor 102 may receive an updated reputation score from reputation server 126 and determine that data 112 is to be treated as safe if the new reputation exceeds a threshold. The threshold may include a threshold originally used at (6). The threshold may include a intermediate threshold lower than originally used at (6) or in a previous reevaluation. The threshold may be new, wherein no threshold was previously used by monitor 102 to evaluate data 112.

In one embodiment, monitor 102 may receive an updated reputation score from reputation server 126 and determine that data 112 is to be treated as malicious if the new reputation is less than a threshold. The threshold may include a threshold originally used at (6). The threshold may include a intermediate threshold higher than originally used at (6) or in a previous reevaluation. The threshold may be new, wherein no threshold was previously used by monitor 102 to evaluate data 112.

In another embodiment, monitor 102 may receive an updated reputation score from reputation server 126 and determine that data 112 is to be treated as safe if the new reputation is greater, in absolute or percentage terms, than a threshold amount over a previous reputation score. The threshold amount may be related to the original reputation score or a reputation score determined during a reevaluation of data 112.

In yet another embodiment, monitor 102 may receive an updated reputation score from reputation server 126 and determine that data 112 is to be treated as malicious if the new reputation is less, in absolute or percentage terms, than a threshold amount over a previous reputation score. The threshold amount may be related to the original reputation score or a reputation score determined during a reevaluation of data 112.

In still yet another embodiment, monitor 102 may determine that data 112 is to be treated as safe if a new reputation score is greater than the original reputation score. Further, monitor 102 may determine that data 112 is to be treated as malicious is a new reputation score is less than the original reputation score. Monitor 102 may make such a determination at the end of a total evaluation time period.

At (11a), in one embodiment if monitor 102 has determined to treat data 112 as safe, data 112 may be allowed to be delivered to client electronic device 108. In another embodiment, at (11a) data 112 may be allowed to be loaded, executed, or otherwise accessed by a part of system 100. At (11b), if monitor 102 has determined to treat data 112 as malicious, then data 112 may be blocked, kept permanently in quarantine 106, or other corrective action taken. An error or spoofed message may be send to network node 110. At (11c), if monitor 102 has not determined whether to treat data 112 as safe or malicious, the evaluation of data 112 may be repeated. Monitor 102 may consider changes within the reputation score of data 112 as well as the duration of the evaluation in deciding whether to repeat the evaluation. For example, if data 112 has received changes in reputation score, the evaluation may continue. If a total threshold length of time has not been reached, the evaluation may continue. If changes in the reputation score have been observed, the threshold length of time for evaluation may be extended. If the reputation score has not changed, changed significantly, or if the threshold length of time has been exceeded, evaluation may be halted. For such data 112 wherein evaluation has been terminated, monitor 102 may permanently quarantine data 112, treat data 112 as malicious, or otherwise take corrective action.

Although shown as executing on network gateway 104, monitor 102 may be executing on any suitable machine, device, or server. In one embodiment, monitor 102 may be executing on a cloud computing system or as a software-as-a-service, wherein monitor 102 scans the traffic encountered at network gateway 104 or other portions of system 100 such as client electronic device 108, but is executing within a different processor on a different device. Furthermore, various portions of system 100, such as antivirus database 116 or quarantine 106 may be resident or executing on any suitable machine, device, or server.

Figure 4:
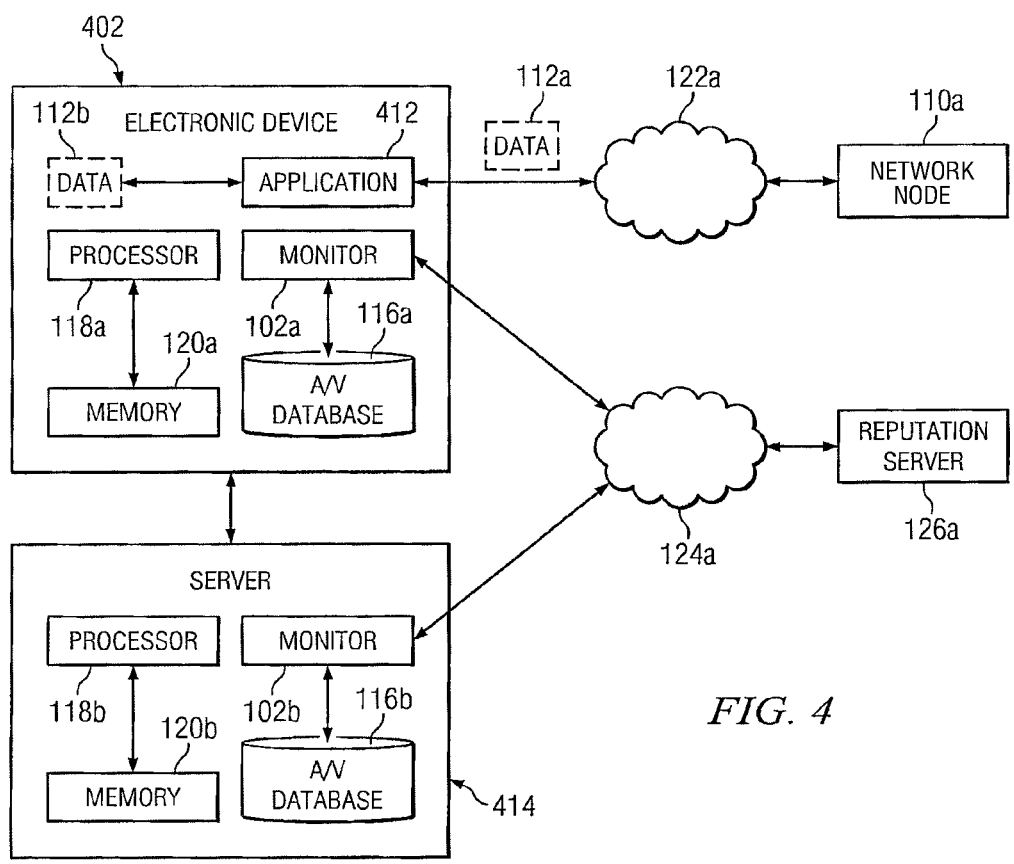
FIG. 4 illustrates an example embodiment of system based upon a monitor configured to execute on or scan an electronic device.

FIG. 4 illustrates an example embodiment of system 100 based upon monitor 102a configured to execute on or scan an electronic device 402. Electronic device 402 may comprise any device configurable to interpret and/or execute program instructions and/or process data, including but not limited to: a computer, desktop, server, laptop, personal data assistant, or smartphone. Electronic device 402 may include an application 412 executing on electronic device 402 and receiving network traffic, such as data 112a from a network node 110a. In one example, application 412 may be known not to include malware, but may nonetheless access data 112a which may include malware. In another example, application 412 may be malware itself or otherwise compromised through a weakness or vulnerability such that it has been exploited by malware. In such cases, monitor 102a may not be able to determine the malware status of application 412, or may mistakenly categorize application 412 as safe.

In one embodiment, monitor 102a may be executing on electronic device 402 and scanning network traffic such as data 112a received by application 412 or data such as data 112b to be accessed by application 412. Monitor 102a may access antivirus database 116a—local to monitor 102a or within the same network as electronic device 402—or reputation server 126a to evaluate and reevaluate data 112a or data 112b and to place it within dynamic quarantine if necessary.

Monitor 102a may include instructions resident on memory 120a of electronic device 402 for execution by processor 118a of electronic device 402.

In another embodiment, monitor 102b may be executing on a server 414 configured to manage, guard, or otherwise protect electronic device 402. Monitor 102b may be scanning network traffic such as data 112a received by application 412 or data such as data 112b to be accessed by application 412. Monitor 102b may access antivirus database 116b—local to monitor 102b or within the same network as server 414—or reputation server 126a to evaluate and reevaluate data 112a or data 112b and to place it within dynamic quarantine if necessary. Monitor 102b may include instructions resident on memory 120b of server 414 for execution by processor 118b of server 414.

Figure 5:
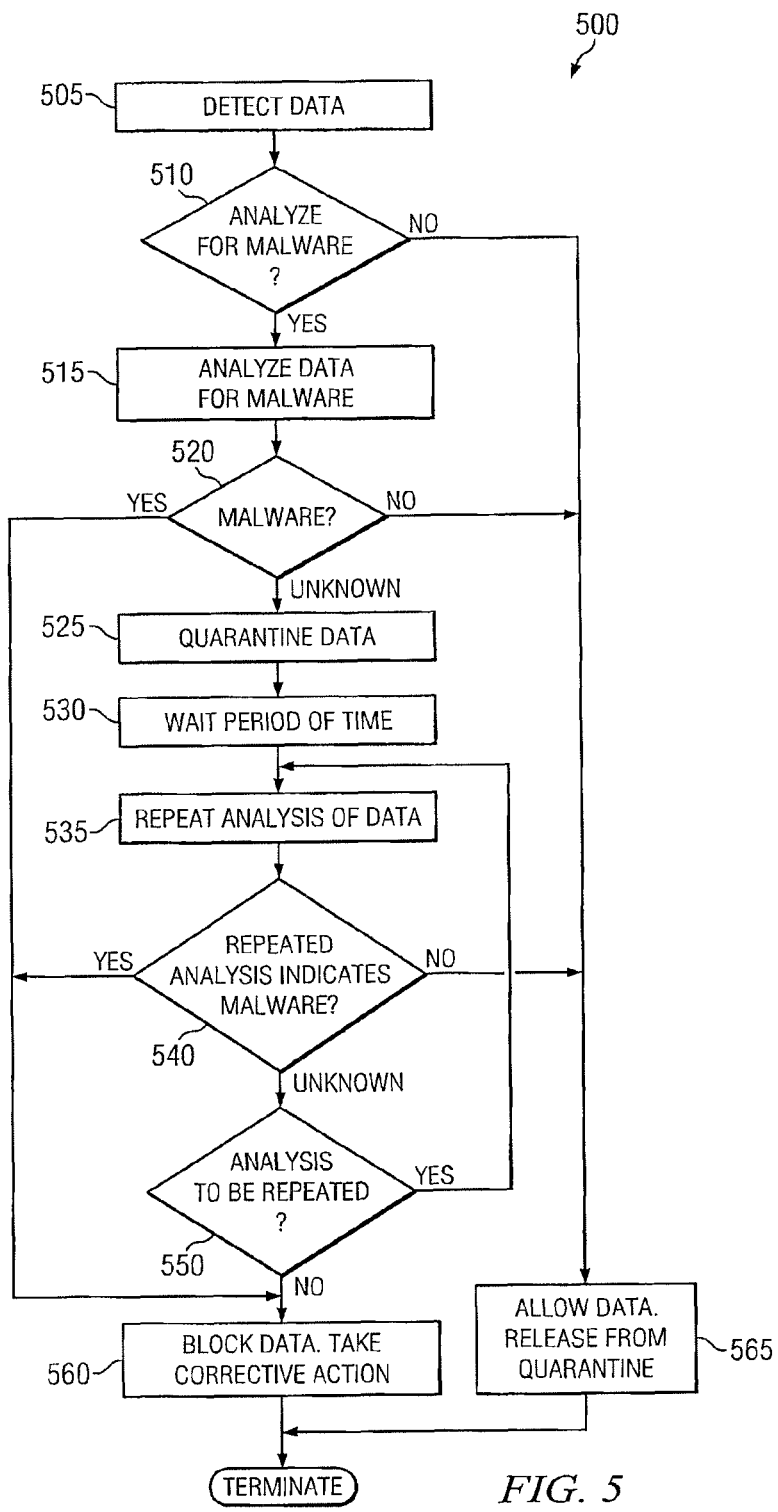
FIG. 5 is an illustration of an example embodiment of a method for dynamic quarantining for malware detection.

FIG. 5 is an illustration of an example embodiment of a method 500 for dynamic quarantining for malware detection. In 505, in one embodiment data intended for an electronic device may be intercepted, observed, or otherwise detected. In one embodiment, such data may be transferred from within the electronic device or created within the device. In another embodiment, such data may be transferred to the electronic device from outside the electronic device. The data may have originated from a particular sender with a network address, flowed through a given network and intermediate entities with network addresses, have particular content, and be intended for a particular recipient. Method 500 may be performed for the benefit of protecting the particular recipient and other entities from malware. In another embodiment, data on an electronic device may be detected. The data may have been configured to be loaded, executed, or otherwise accessed in the electronic device. Method 500 may be performed for the benefit of protecting the electronic device on which the data is resident. The data may include a file, e-mail, e-mail attachment, or other digital data. In 510, it may be determined whether the data will be further analyzed for malware. Such a determination may be based upon, for example, the sender or intermediate entities, the recipient, the content of the data, or the type of data. In one embodiment, all data may be analyzed. If the data is not to be analyzed, method 500 may proceed to 565.

If the data is to be analyzed for malware, in 515 the data may be analyzed. Such analysis may be performed using, for example, local anti-malware databases, rules, and heuristics, or by accessing a cloud-computing service or server. Such analysis of 515 may be implemented fully or in part by method 600 of FIG. 6. Such analysis may result in, for example, a quantification, measure, or representation of the malicious or safe character of the data. For example, a quantification of the likelihood that the data is malicious or safe, such as a reputation score, may be received.

In 520, the results of the analysis may be evaluated to determine whether the data is associated with malware or not. If it has been determined that the data is malicious, then method 500 may proceed to 560. If it has been determined that the data is safe, then method 500 may proceed to 565. If it has been determined that the malware status of the data is unknown, then method 500 may proceed to 525.

In 525, the data may be placed in quarantine. Such quarantine may include a sandbox, secured memory, e-mail quarantine, e-mail store, or other protective space configured to prevent the data from operating on system resources. An administrator, user, or intended recipient may be notified. The sender of the data may be notified with a message, error, or spoofed message.

In 530, the data may be held within quarantine for a period of time, such as one minute, ten minutes, or a half-hour. The period of time may be configurable. The period of time may be based on previous evaluations of the data, wherein increased changes in the evaluation caused the period of time to decrease, or decreased changes in the evaluation caused the period of time to increase. The data may be held in quarantine during this time.

In 535, analysis of the data may be repeated. Some or all of 515 may be repeated, and may be implemented fully or in part by method 600 of FIG. 6. Some analysis, such as accessing local anti-malware rules, heuristics, or databases, may be repeated if there has been a change in such rules, but otherwise not repeated. Different criteria may be used in 535, as opposed to 515 or previous execution of 535. For example, different thresholds of the likelihood of malware, or different thresholds in the change of such likelihood, may be applied in 535 as opposed to previous execution of 535 or 515. In one example, upper thresholds for determining that the data is to be treated as if it were safe may be lowered during execution of 535. In another example, lower thresholds for determining that the data is to be treated as malicious may be raised during execution of 535. In yet another example, thresholds of change for determining that the data is to be treated as malicious or as it were safe may be lowered during execution of 535. An updated quantification, measure, or representation of the likelihood that the data is malicious or safe, such as a reputation score, may be received. The updated quantification may be evaluated as to the likelihood that the data is malicious or safe against the original quantification received in 515 or in a previously received quantification in a previous execution of 535.

In 540, it may be determined whether the analysis indicates that the data is associated malware. If the analysis indicates that the data is associated with malware, then method 500 may proceed to 560. If the analysis indicates that the data is safe, then method 500 may proceed to 565. If it has been determined that the malware status of the data is unknown, then method 500 may proceed to 550.

In 550, it may be determined whether to continue to dynamically quarantine the data while waiting for a more certain likelihood that the data is malicious or safe. The determination may be made by, for example, a limit on the total amount of time which the data may be quarantined, such as twenty-four hours. The time limit may be reset, extended, or contracted based upon results of analysis in 535. For example, repeated observed changes in the likelihood through multiple executions of 535 may cause the time limit to be reset or extended. In another example, observations in 535 that the likelihood has not changed may cause the time limit to be contracted. If analysis is to be repeated, method 500 may proceed to 535. If analysis is not to be repeated, method 500 may proceed to 560 or otherwise permanently quarantine the data.

In 560, it may have been determined that the data is malicious or is to be treated as if it were malicious. The data may be deleted, removed, or otherwise permanently rendered inoperable. A recipient of the data, administrator, or user may be notified. An error or spoofed message may be sent to the sender. Information regarding the data and subsequent analysis may be recorded or sent to an anti-malware server.

In 565, it may have been determined that the data is safe or is to be treated as if it were safe. The data may be automatically released from quarantine and sent to the intended recipient. An operator may be informed regarding the determination. Information regarding the data and subsequent analysis may be recorded or sent to an anti-malware server.

Figure 6:
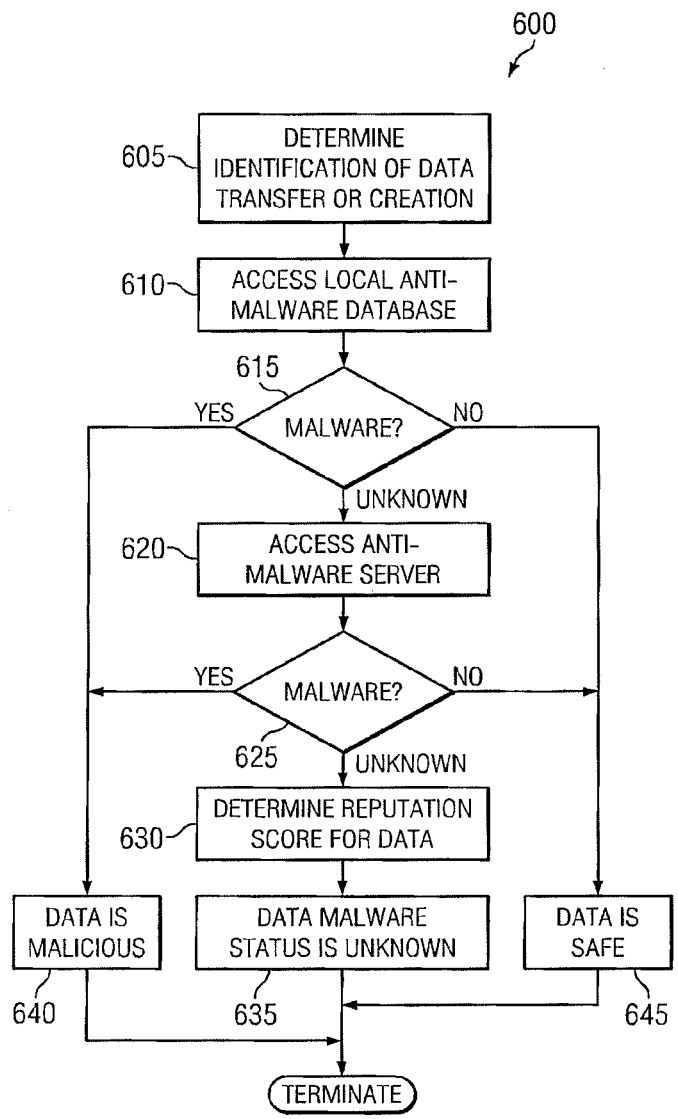
FIG. 6 is an illustration of an example embodiment of a method for analyzing data.

FIG. 6 is an illustration of an example embodiment of a method 600 for analyzing a portion of data. In 605, an identification of the data may be determined. For example, a digital signature or hash for some or all of the data may be calculated. In another example, a network address of the sender of the data, or of intermediate entities forwarding the data, may be determined. In another example, a network address of links within the content of the data may be determined. The identification may be used to access malware information for the data.

In 610, a local anti-malware database, rules, or heuristics may be accessed using the identification to determine whether it the associated data is safe, malicious, or unknown. The local anti-malware information may be resident within a local device or a server connected through a local-area-network. In 615, the results may be analyzed. If the identification is associated with malware, method 600 may proceed to 640. If the identification is associated with safe data, method 600 may proceed to 645. If the identification is not associated with either malware or safe entities, or is otherwise unknown, method 600 may proceed to 620. In one embodiment, method 600 may skip 610-615.

In 620, an anti-malware server may be accessed using the identification to determine whether it the associated data is safe, malicious, or unknown. The anti-malware server may be accessible through a cloud-computing scheme, and may contain real-time data regarding malware. A likelihood of association with malware, such as reputation score, may be retrieved from the anti-malware server. In 625, the results may be analyzed. If the identification is associated with malware, method 600 may proceed to 640. If the identification is associated with safe data, method 600 may proceed to 645. If the identification is not associated with either malware or safe entities, or is otherwise unknown, method 600 may proceed to 635.

At 635, it may be determined that the malware status of the data is unknown. A likelihood, such as a reputation score, may be provided with the determination. At 640, it may be determined that the malware status of the data is malicious. The determination may be certain or an approximation based on a likelihood. At 645, it may be determined that the malware status of the data is safe. The determination may be certain or an approximation based on a likelihood.

Figure 7:
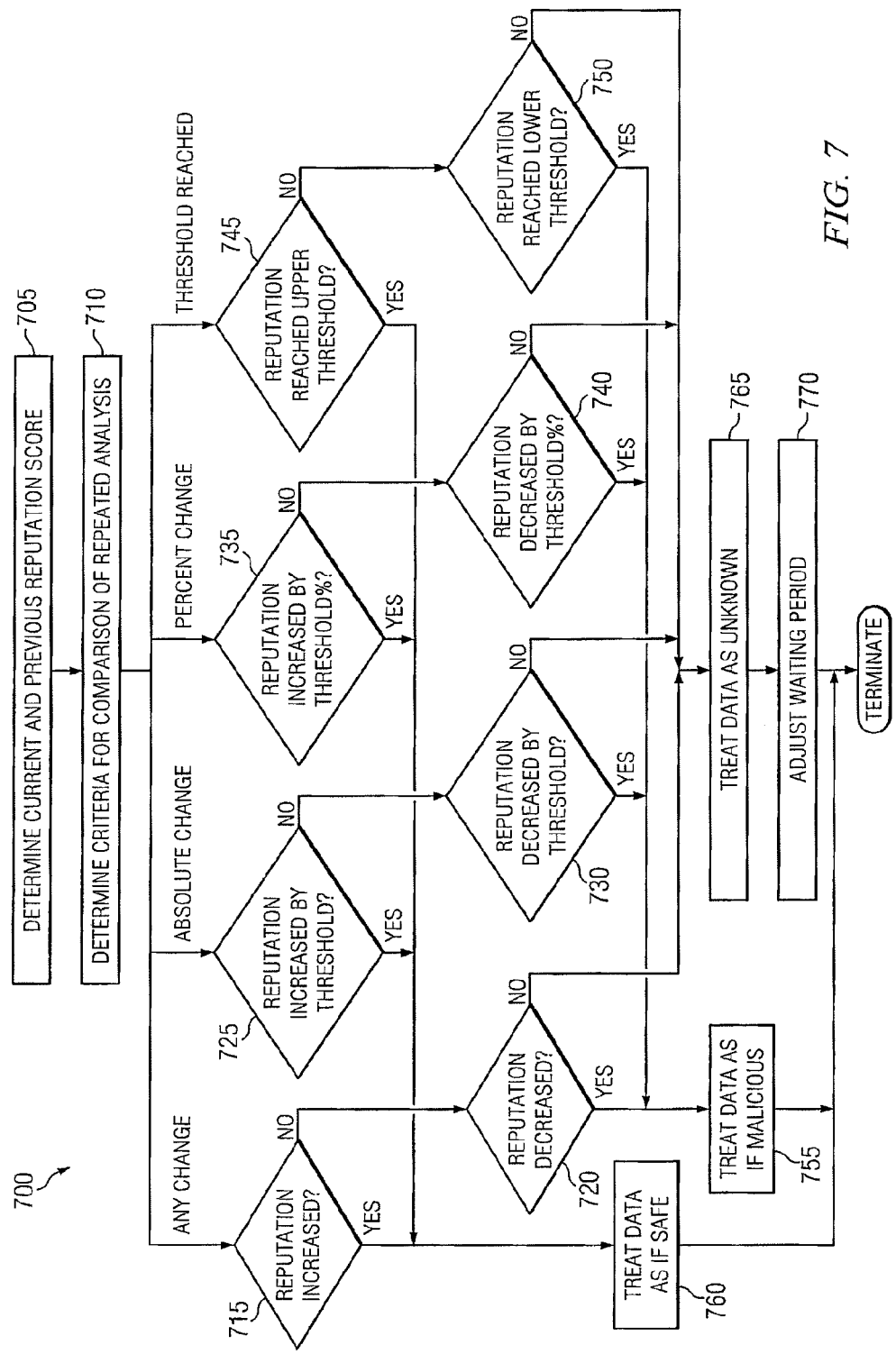
FIG. 7 is an illustration of an example embodiment of a method for comparing quantifications of likelihood of malware.

FIG. 7 is an illustration of an example embodiment of a method 700 for comparing quantifications of likelihood of malware. Method 700 may include determining whether a portion of data is safe, malicious, or unknown based upon a repeated evaluation of the data. Method 700 may be based upon quantification of the likelihood that the data is malicious. Such a quantification may include, for example, a reputation score. Method 700 may be further based on comparison of a presently determined quantification with a previously determined quantification. The previously determined quantification may include, for example, an original quantification or an iterative, intermediate quantification. Thus, the comparisons described below in conjunction with method 700 may between a present quantification and any such previous quantification.

In 705, a current and previous quantification such as a reputation score may be determined. Such scores may have been determined by, for example, execution of method 600 of FIG. 6. In 710, one or more criteria for comparing reputation score may be selected. The criteria may be chosen between, for example: whether any change in reputation score has occurred, in which case method 700 may proceed to 715; whether reputation has changed by an absolute threshold amount, in which case method 700 may proceed to 725; whether reputation has changed by a percentage amount, in which case method 700 may proceed to 735; or whether reputation has reached an upper or lower threshold limit, in which case method 700 may proceed to 745. In one embodiment, the selection of criteria in 710 may be made by configuration of the system on which 700 is running. In another embodiment, a particular criteria may be selected based on a number of iterations or length of time that the data has been analyzed. For example, one of absolute change, percent change, or reached threshold may be used during on operation of method 700, and in a subsequent operation of method 700, any change criteria in 715 may be selected.

In 715, it may be determined whether any change in reputation score has been made between the current and the previous quantification. If the reputation has increased, then method 700 may proceed to 760. If the reputation has not increased, then in 720 it may be determined whether the reputation has decreased, and, if so, method 700 may proceed to 755. If the reputation has not decreased, then method 700 may proceed to 765.

In 725, it may be determined whether a change in reputation score in excess of one or more thresholds has been made between the current and the previous quantification. If the reputation has increased beyond a first threshold difference, then method 700 may proceed to 760. If the reputation has not increased beyond a first threshold difference, then in 730 it may be determined whether the reputation has decreased beyond a second threshold difference, and, if so, method 700 may proceed to 755. If the reputation has not decreased beyond a second threshold difference, then method 700 may proceed to 765. The first and second thresholds may be the same or different. Further, the first and second thresholds may be expressed in terms of absolute value of reputation. In addition, the first and second thresholds may be different from other thresholds described in conjunction with FIG. 7.

In 735, it may be determined whether a percentage change in reputation score in excess of one or more thresholds has been made between the current and the previous quantification. If the reputation has increased beyond a first threshold percentage difference, then method 700 may proceed to 760. If the reputation has not increased beyond a first threshold percentage difference, then in 740 it may be determined whether the reputation has decreased beyond a second threshold percentage difference, and, if so, method 700 may proceed to 755. If the reputation has not decreased beyond a second threshold percentage difference, then method 700 may proceed to 765. The first and second thresholds may be the same or different. Further, the first and second thresholds may be expressed in terms of a percentage value of reputation. In addition, the first and second thresholds may be different from other thresholds described in conjunction with FIG. 7.

In 745, it may be determined whether reputation has reached an upper or lower threshold reputation score between the current and the previous quantification. If the reputation has increased beyond an upper threshold, then method 700 may proceed to 760. If the reputation has not increased beyond an upper threshold, then in 750 it may be determined whether the reputation has decreased beyond a lower threshold, and, if so, method 700 may proceed to 755. If the reputation has not decreased beyond a lower threshold, then method 700 may proceed to 765.

The thresholds described in conjunction with FIG. 7 may be set according to particular implementations of a system associated with method 700. Further, the thresholds used by method 700 may be adjusted between different executions of method 700. For example, subsequent executions of method 700 may utilize smaller reputation difference thresholds, or narrower gaps between upper and lower thresholds.

In 755, it may be determined that the data is to be handled as if it is malicious and associated with malware. In 760, it may be determined that the data is to be handled as if the data is safe and does not contain malware. It 765, it may be determined that the data is to be handled as if has a malware status that is unknown. In 770, a waiting period to be conducted between executions of method 700 or other methods may be adjusted. Furthermore, the criteria and thresholds used in conjunction with method 700 may be adjusted.

Methods 500, 600, and 700 may be implemented using the system of FIGS. 1-4 or any other system operable to implement methods 500, 600, and 700. As such, the preferred initialization point for methods 500, 600, and 700 and the order of the elements comprising methods 500, 600, and 700 may depend on the implementation chosen. In some embodiments, some elements may be optionally omitted, repeated, or combined. In certain embodiments, methods 500, 600, and 700 may be implemented partially or fully in software embodied in computer-readable media.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such wires, optical fibers, and other electromagnetic and/or optical carriers; and/or any combination of the foregoing. The following examples pertain to further embodiments. Specifics in the examples may be used anywhere in one or more embodiments described above or herein.

The following examples pertain to further embodiments.

A method for preventing malware attacks may be performed on an electronic device. Any suitable portions or aspects of the method may be implemented in at least one machine readable storage medium or in a system, as described below. The method may include any suitable combination of elements, actions, or features. For example, the method may include analyzing a portion of data. Further, the method may include determining a first representation of the malware status of the data. The first representation may indicate that the malware status of the data is not certain to be safe and the malware status of the data is not certain to be malicious. In addition, the method may include quarantining the data for a period of time. The method may include determining a second representation of the malware status of the data, estimating whether the data is associated with malware by comparing the first and second representation. Furthermore, the method may include, based on the estimation of whether the data is associated with malware, releasing the data from quarantine. In the method, comparing the first and second representation may include determining whether representation has changed, indicating an increased likelihood that the data is safe, and determining whether the data is associated with malware may include estimating that the data is safe based upon the increased likelihood that the data is safe. Comparing the first and second representation may include determining whether representation has changed, indicating an decreased likelihood that the data is safe, and determining whether the data is associated with malware may include estimating that the data is malicious based upon the decreased likelihood that the data is safe. The data may be blocked from arriving at an intended recipient if the data is associated with malware. Comparing the first and second representation may include determining whether the second representation has crossed a threshold value. Comparing the first and second representation may yield a determination that the malware status of the data is not certain to be safe, and that the malware status of the data is not certain to be malicious. If such a determination is made, the method may further include, based on the determination, repeating the quarantining and determining a third representation of the malware status of the data, comparing the third representation to a previously determined representation, and based on the comparison estimating the malware status of the data. The representations may include a reputation score.

At least one machine readable storage medium may include computer-executable instructions carried on the computer readable medium. Various aspects of the medium may implement any suitable portions or combinations of the method described above or the system described below. The instructions may be readable by a processor. The instructions, when read and executed, may cause the processor to analyze a portion of data. Furthermore, the processor may be caused to determine a first representation of the malware status of the data. The first representation may indicate that the malware status of the data is not certain to be safe and the malware status of the data is not certain to be malicious. The processor may be caused to quarantine the data for a period of time. In addition, the processor may be caused to determine a second representation of the malware status of the data. Also, the processor may be caused to estimate whether the data is associated with malware by comparing the first and second representation. Furthermore, the processor may be caused to, based on the estimation of whether the data is associated with malware, release the data from quarantine. Comparing the first and second representation may include determining whether representation has changed, indicating an increased likelihood that the data is safe, while determining whether the data is associated with malware may include estimating that the data is safe based upon the increased likelihood that the data is safe. Furthermore, comparing the first and second representation may include determining whether representation has changed, indicating an decreased likelihood that the data is safe, while determining whether the data is associated with malware may include estimating that the data is malicious based upon the decreased likelihood that the data is safe. In addition, the data may be blocked from arriving at an intended recipient if the data is associated with malware. Also, comparing the first and second representation may include determining whether the second representation has crossed a threshold value. Moreover, comparing the first and second representation may yield a determination that the malware status of the data is not certain to be safe and the malware status of the data is not certain to be malicious. The processor may be further caused to, based on the determination, repeat the quarantining and determine a third representation of the malware status of the data, compare the third representation to a previously determined representation, and, based on the comparison, estimate the malware status of the data. Furthermore, the representations may include a reputation score.

A system may be configured for preventing malware attacks. The system may implement any suitable portions or combinations of the method or the at least one machine readable storage medium as described above. The system may include a processor coupled to a computer readable medium and computer-executable instructions carried on the computer readable medium. The instructions may be readable by a processor. The instructions, when read and executed, may cause the processor to analyze a portion of data. Furthermore, the processor may be caused to determine a first representation of the malware status of the data. The first representation may indicate that the malware status of the data is not certain to be safe and the malware status of the data is not certain to be malicious. The processor may be caused to quarantine the data for a period of time. In addition, the processor may be caused to determine a second representation of the malware status of the data. Also, the processor may be caused to estimate whether the data is associated with malware by comparing the first and second representation. Furthermore, the processor may be caused to, based on the estimation of whether the data is associated with malware, release the data from quarantine. Comparing the first and second representation may include determining whether representation has changed, indicating an increased likelihood that the data is safe, while determining whether the data is associated with malware may include estimating that the data is safe based upon the increased likelihood that the data is safe. Furthermore, comparing the first and second representation may include determining whether representation has changed, indicating a decreased likelihood that the data is safe, while determining whether the data is associated with malware may include estimating that the data is malicious based upon the decreased likelihood that the data is safe. In addition, the data may be blocked from arriving at an intended recipient if the data is associated with malware. Also, comparing the first and second representation may include determining whether the second representation has crossed a threshold value. Moreover, comparing the first and second representation may yield a determination that the malware status of the data is not certain to be safe and the malware status of the data is not certain to be malicious. The processor may be further caused to, based on the determination, repeat the quarantining and determine a third representation of the malware status of the data, compare the third representation to a previously determined representation, and, based on the comparison, estimate the malware status of the data. Furthermore, the representations may include a reputation score.

Specifics in the examples above may be used anywhere in one or more embodiments.

Although the present disclosure has been described in detail, it should be understood that various changes, substitutions, and alterations can be made hereto without departing from the spirit and the scope of the disclosure as defined by the appended claims.

What is claimed is:

1. A method for preventing malware attacks, comprising:
    on an electronic device, analyzing a portion of data;
    determining a first representation of the malware status of the data, including:
        determining that the malware status of the data is not certain to be safe; and
        determining that the malware status of the data is not certain to be malicious;
    quarantining the data for a period of time based on the determination of the first representation of the malware status of the data;
    determining a second representation of the malware status of the same data after the period of time;
    estimating whether the data is associated with malware by comparing the first and second representation; and
    based on the estimation of whether the data is associated with malware, releasing the data from quarantine.

2. The method of claim 1, wherein:
    comparing the first and second representation includes determining whether representation has changed, indicating an increased likelihood that the data is safe; and
    determining whether the data is associated with malware includes estimating that the data is safe based upon the increased likelihood that the data is safe.

3. The method of claim 1, wherein:
    comparing the first and second representation includes determining whether representation has changed, indicating an decreased likelihood that the data is safe; and
    determining whether the data is associated with malware includes estimating that the data is malicious based upon the decreased likelihood that the data is safe.

4. The method of claim 3, wherein the data is blocked from arriving at an intended recipient if the data is associated with malware.

5. The method of claim 3, wherein comparing the first and second representation includes determining whether the second representation has crossed a threshold value.

6. The method of claim 1, wherein comparing the first and second representation yields a determination that:
    the malware status of the data is not certain to be safe; and
    the malware status of the data is not certain to be malicious; and further comprising:
    based on the determination, repeating the quarantining and determining a third representation of the malware status of the data;
    comparing the third representation to a previously determined representation; and
    based on the comparison, estimating the malware status of the data.

7. The method of claim 1, wherein the representations include a reputation score.

8. At least one non-transitory machine readable storage medium, comprising computer-executable instructions carried on the non-transitory machine readable storage medium, the instructions readable by a processor, the instructions, when read and executed, for causing the processor to:
    analyze a portion of data;
    determine a first representation of the malware status of the data, including:
        determining that the malware status of the data is not certain to be safe; and
        determining that the malware status of the data is not certain to be malicious;
    quarantine the data for a period of time;
    determine a second representation of the malware status of the same data after the period of time;
    estimate whether the data is associated with malware by comparing the first and second representation; and
    based on the estimation of whether the data is associated with malware, release the data from quarantine.

9. The at least one machine readable storage medium of claim 8, wherein:
    comparing the first and second representation includes determining whether representation has changed, indicating an increased likelihood that the data is safe; and
    determining whether the data is associated with malware includes estimating that the data is safe based upon the increased likelihood that the data is safe.

10. The at least one machine readable storage medium of claim 8, wherein:
    comparing the first and second representation includes determining whether representation has changed, indicating an decreased likelihood that the data is safe; and
    determining whether the data is associated with malware includes estimating that the data is malicious based upon the decreased likelihood that the data is safe.

11. The at least one machine readable storage medium of claim 10, wherein the data is blocked from arriving at an intended recipient if the data is associated with malware.

12. The at least one machine readable storage medium of claim 10, wherein comparing the first and second representation includes determining whether the second representation has crossed a threshold value.

13. The at least one machine readable storage medium of claim 8, wherein:
  comparing the first and second representation yields a determination that:
    the malware status of the data is not certain to be safe; and
    the malware status of the data is not certain to be malicious; and
  the processor is further caused to:
    based on the determination, repeat the quarantining and determine a third representation of the malware status of the data;
    compare the third representation to a previously determined representation; and
    based on the comparison, estimate the malware status of the data.

14. The at least one machine readable storage medium of claim 8, wherein the representations include a reputation score.

15. A system for preventing malware attacks, comprising:
  a device including a portion of data;
  a processor coupled to a computer readable medium; and
  computer-executable instructions carried on the computer readable medium, the instructions readable by the processor, the instructions, when read and executed, for causing the processor to:
    analyze the data;
    determine a first representation of the malware status of the data, including:
      determining that the malware status of the data is not certain to be safe; and
      determining that the malware status of the data is not certain to be malicious;
    quarantine the data for a period of time;
    determine a second representation of the malware status of the same data after the period of time;
    estimate whether the data is associated with malware by comparing the first and second representation; and
    based on the estimation of whether the data is associated with malware, release the data from quarantine.

16. The system of claim 15, wherein:
  comparing the first and second representation includes determining whether representation has changed, indicating an increased likelihood that the data is safe; and
  determining whether the data is associated with malware includes estimating that the data is safe based upon the increased likelihood that the data is safe.

17. The system of claim 15, wherein:
  comparing the first and second representation includes determining whether representation has changed, indicating a decreased likelihood that the data is safe; and
  determining whether the data is associated with malware includes estimating that the data is malicious based upon the decreased likelihood that the data is safe.

18. The system of claim 17, wherein the data is blocked from arriving at an intended recipient if the data is associated with malware.

19. The system of claim 17, wherein comparing the first and second representation includes determining whether the second representation has crossed a threshold value.

20. The system of claim 15, wherein:
  comparing the first and second representation yields a determination that:
    the malware status of the data is not certain to be safe; and
    the malware status of the data is not certain to be malicious; and
  the processor is further caused to:
    based on the determination, repeat the quarantining and determine a third representation of the malware status of the data;
    compare the third representation to a previously determined representation; and
    based on the comparison, estimate the malware status of the data.

* * * * *